April 3, 1962 C. J. DANIELS ETAL 3,028,127
AIRCRAFT ARRESTING MEANS
Filed May 22, 1957 5 Sheets-Sheet 1
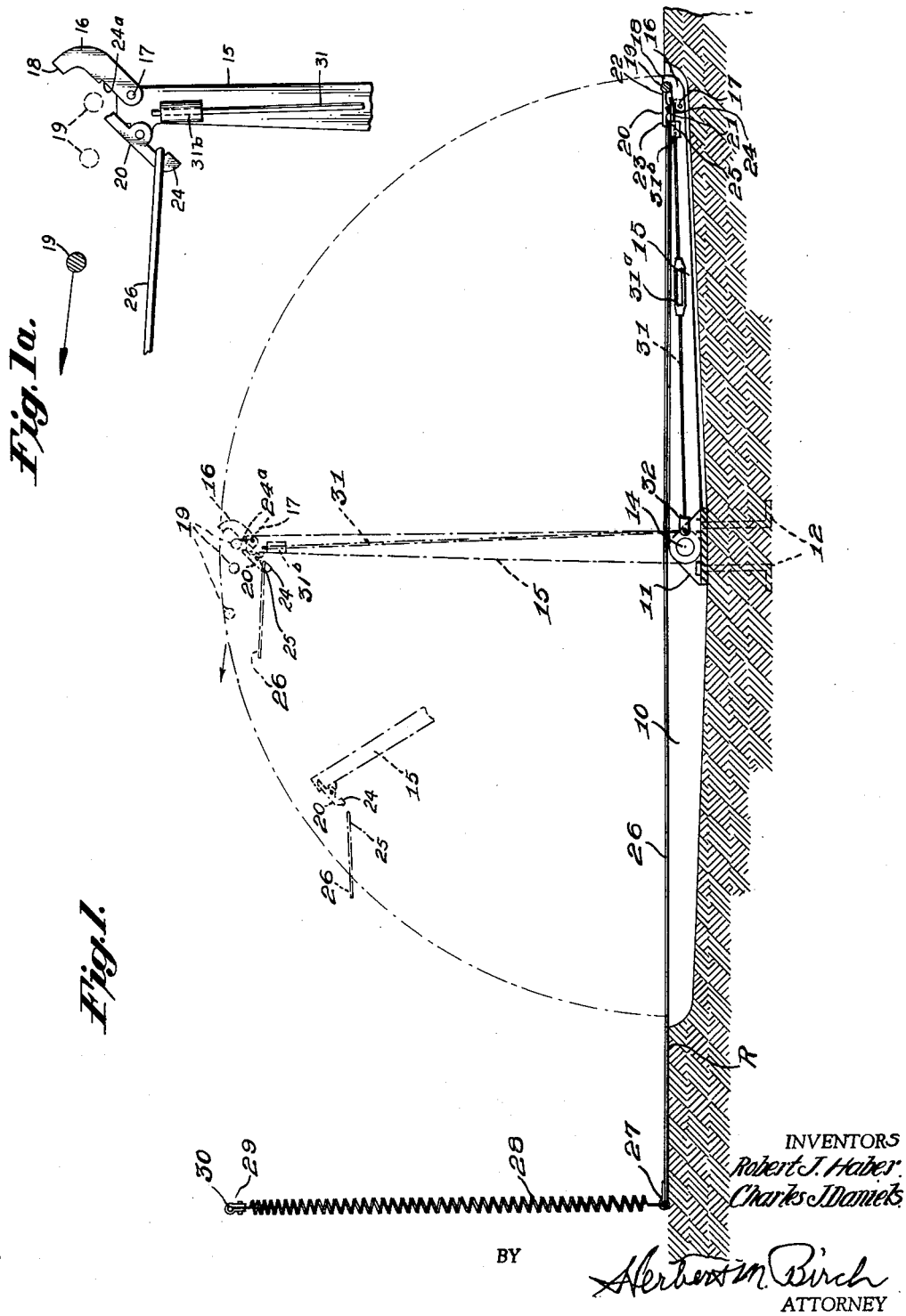
INVENTORS
Robert J. Haber
Charles J. Daniels
BY
Herbert M. Birch
ATTORNEY

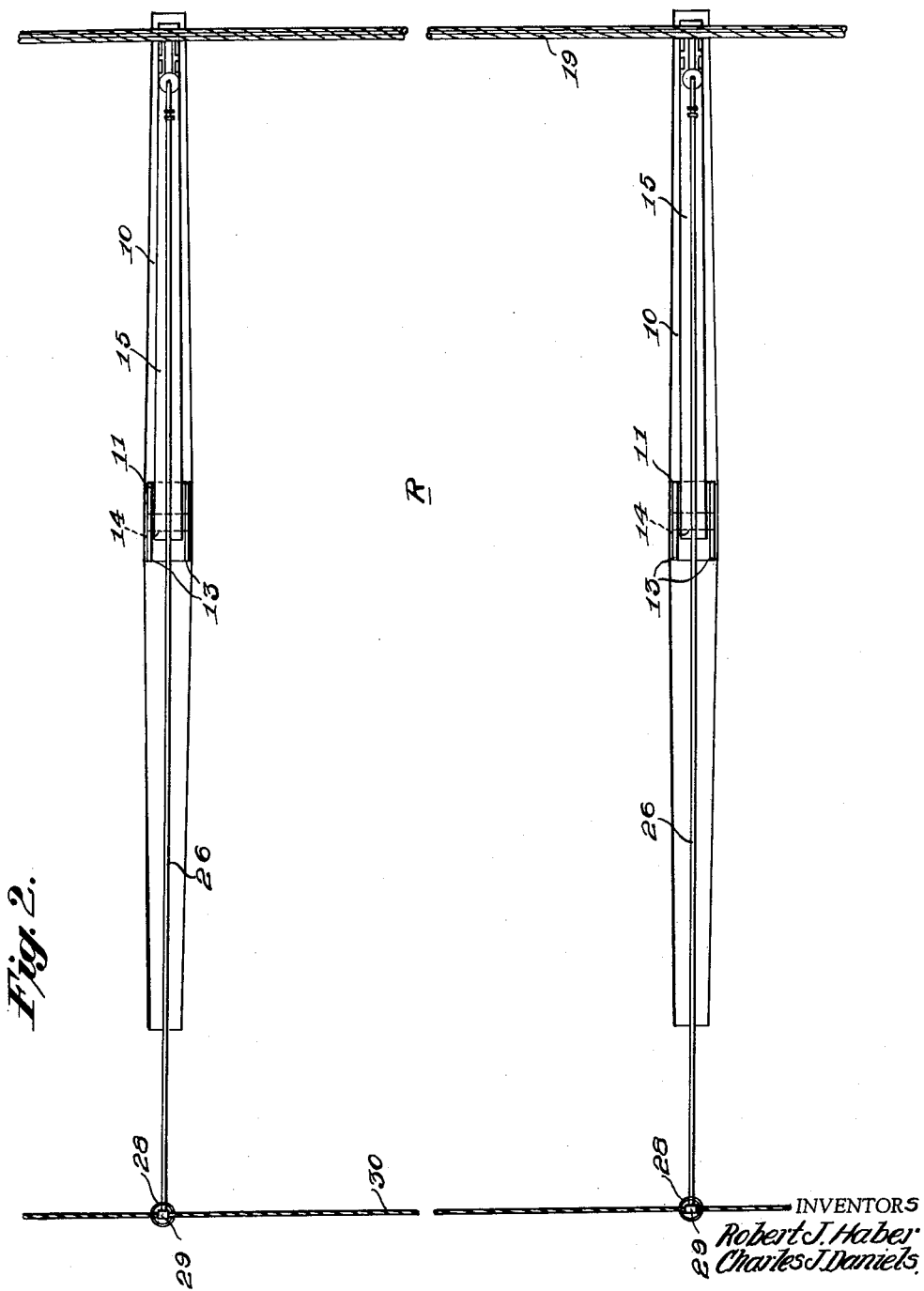

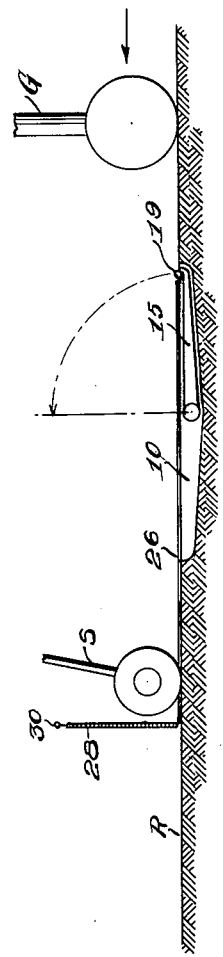
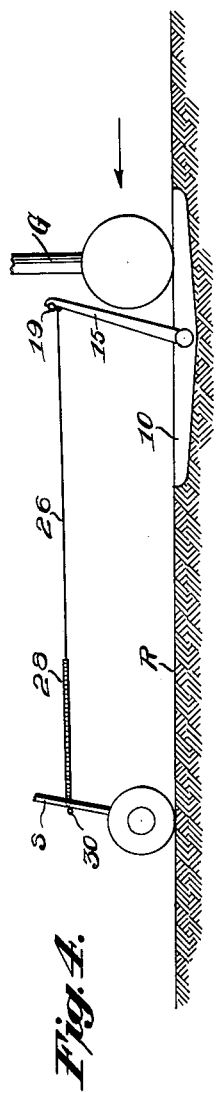
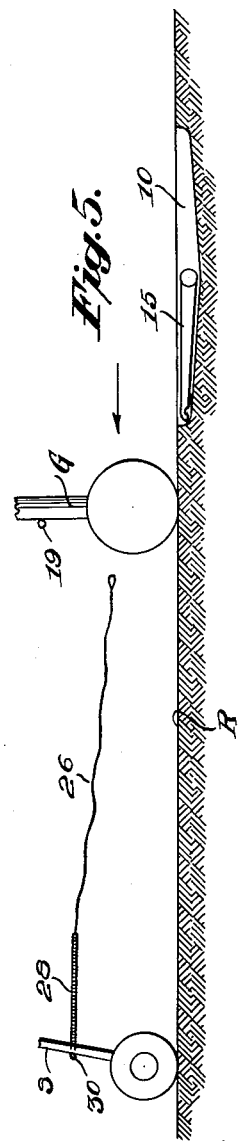

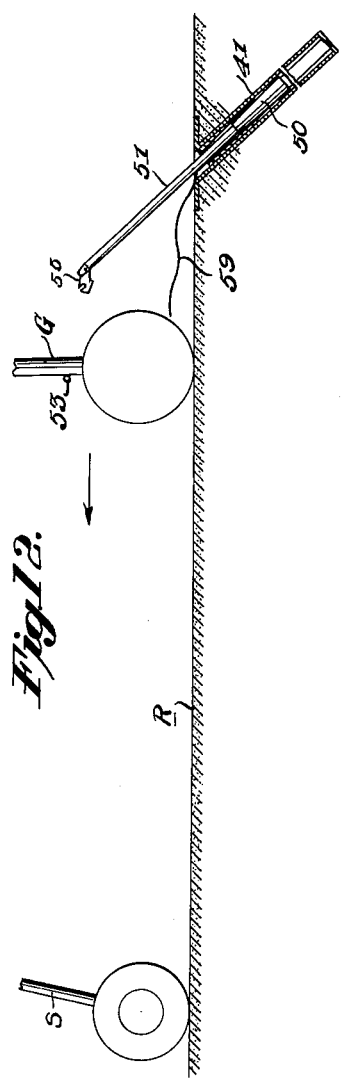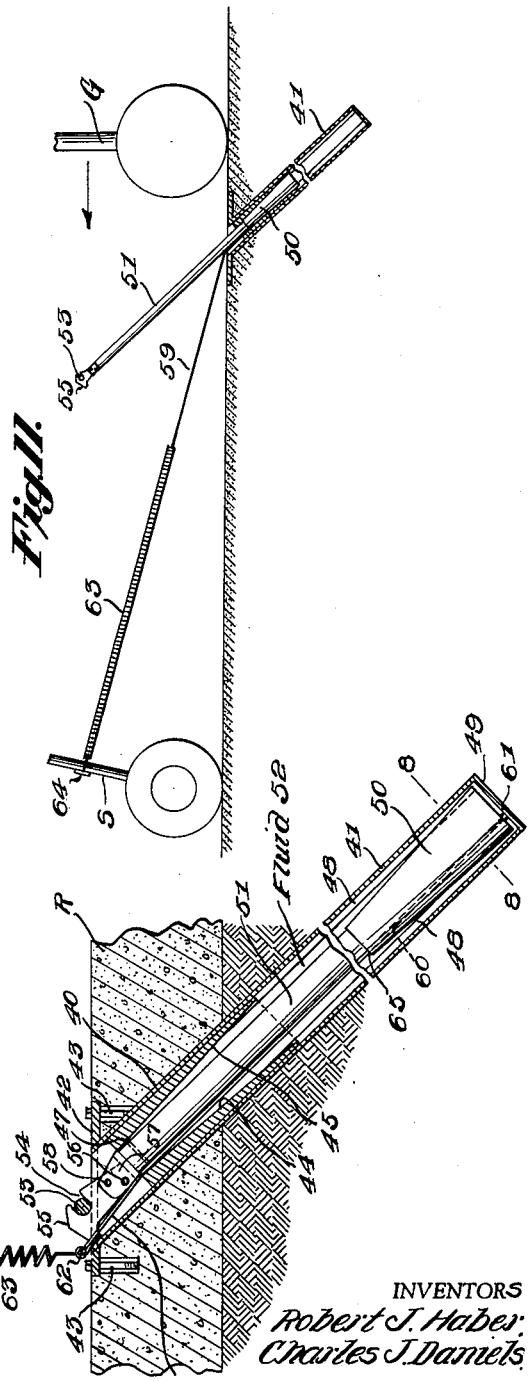

April 3, 1962   C. J. DANIELS ETAL   3,028,127
AIRCRAFT ARRESTING MEANS
Filed May 22, 1957   5 Sheets-Sheet 5
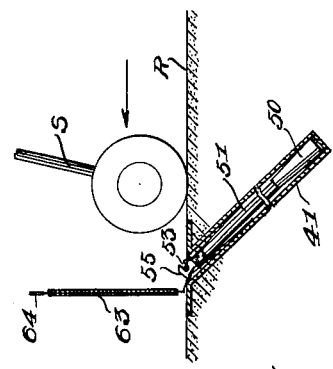
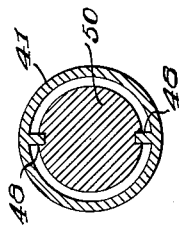
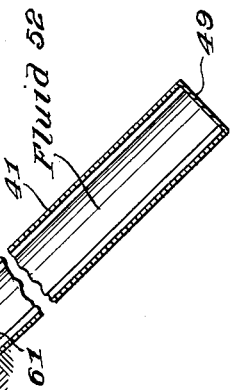
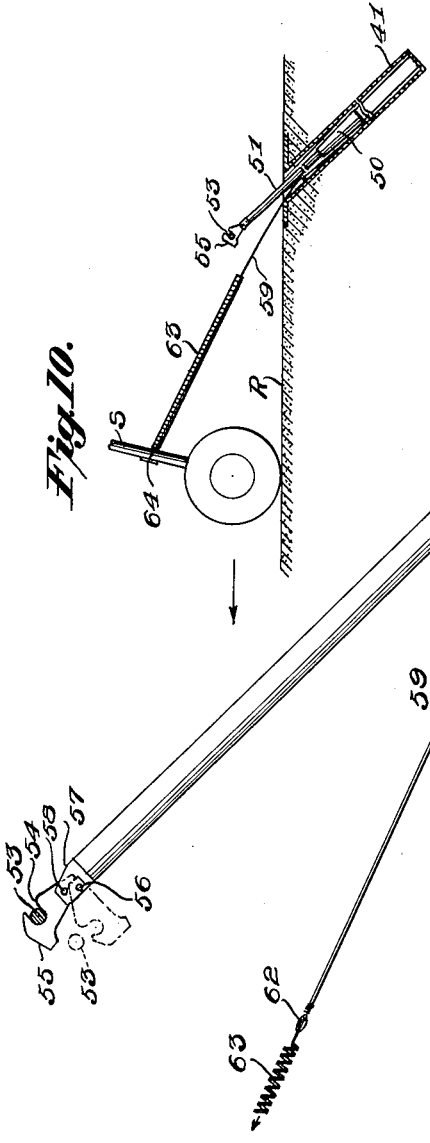
INVENTORS
Robert J. Haber
Charles J. Daniels
BY
Herbert M. Birch
ATTORNEY United States Patent Office 3,028,127
Patented Apr. 3, 1962

3,028,127
AIRCRAFT ARRESTING MEANS
Charles J. Daniels and Robert J. Haber, Wilmington, Del., assignors to All American Engineering Company, Wilmington, Del., a corporation of Delaware
Filed May 22, 1957, Ser. No. 660,845
2 Claims. (Cl. 244—110)

This invention relates to aircraft arresting means.

The invention is more particularly concerned with aircraft arresting means embodying an aircraft main gear engageable arresting cable normally disposed transversely of a runway and in engagement therewith, whose opposite end portions are each connected with an arresting gear disposed lengthwise of and longitudinally of the runway, and which further embodies nose wheel strut engaging means in advance of said arresting cable together with connections between such means and the arresting cable for elevating the latter into main gear engaging position upon forward movement of the nose wheel strut.

While the above referred to general form of arresting means is known and has proven generally satisfactory in use, it is a primary object of this invention to provide for more positive disposition of the arresting cable relative to an aircraft main gear, whereby the cable is engaged by the main gear at uniform elevations above the runway in all successive aircraft arresting operations.

A further and more specific object of the invention is to provide an aircraft arresting means of the character disclosed including an aircraft main gear engageable arresting cable and a nose wheel strut engageable actuating member, said arresting cable being initially releasably supported on the outer end of a stanchion supported on the runway in an initially retracted flush surface position with the arresting cable lying on the runway, and wherein said actuating member is connected to said stanchion for extending the same upon forward movement of said nose wheel strut, whereby the arresting cable is disposed in the path of said aircraft main gear for aircraft arresting movement thereby.

Other objects and advantages of the invention will become apparent in the course of the following detailed description, taken in connection with the accompanying drawings wherein:

FIG. 1 is a side elevational view of one unit of the aircraft arresting means in accordance with one structural embodiment thereof, and wherein the runway is shown in vertical section.

FIGURE 1a is an enlarged view of the arrest cable retaining members in arrest cable release position.

FIG. 2 is a top plan view of a pair of units as preferably involved in the arresting means of FIG. 1.

FIGS. 3, 4 and 5 are vertical sectional views of a portion of a runway each showing more or less diagrammatically, the nose wheel strut and main gear of an aircraft and wherein FIG. 3 discloses the nose wheel strut in a position about to engage an actuating cable which in turn operates to position an arresting cable into the path of the main gear of the aircraft.

FIG. 4 discloses an advanced position of the aircraft and wherein the nose wheel strut has engaged the actuating cable which through intervening means has positioned the arresting cable in the path of the main gear of the aircraft for engagement thereby.

FIG. 5 discloses a further advanced position of the aircraft and wherein the main gear has engaged the arresting cable and the said intervening means has been rendered inoperative.

FIG. 6 is a vertical sectional view of a portion of a runway and wherein is disclosed an aircraft arresting means in accordance with a second structural embodiment thereof, and wherein the arresting means is in inoperative position.

FIG. 7 is a vertical sectional view of a portion of a runway disclosing the arresting means of FIG. 6 in operative position.

FIG. 8 is an enlarged sectional view as observed in the plane of line 8—8 of FIG. 6.

FIGS. 9, 10, 11 and 12 are more or less diagrammatic views corresponding to FIGS. 3, 4 and 5 and wherein FIG. 9 discloses the nose wheel strut of an aircraft in a position about to engage an actuating tape which in turn operates to position an arresting cable into the path of the main gear of the aircraft for engagement thereby.

FIG. 10 discloses an advanced position of the aircraft and wherein the nose wheel strut has engaged the actuating tape which through intervening means has moved the arresting cable to a point intermediate its inoperative position and its operative or main gear engaging position FIG. 11 discloses a further advanced position of the aircraft and wherein the arresting cable has been moved to a position for engagement by the main gear of the aircraft.

FIG. 12 discloses a still further advanced position of the aircraft and wherein the main gear has engaged the arresting cable and the said intervening means has been rendered inoperative.

Referring now in detail to FIGS. 1 to 5, wherein the first embodiment of the invention is disclosed, and with particular reference to FIGS. 1 and 2 the runway or landing surface R is provided with at least two laterally spaced parallel trenches 10 extending longitudinally of the runway. These trenches are, for example, preferably disposed fifteen to twenty feet apart and of which there may be more than two. A bracket 11 is disposed within each trench 10 intermediate the ends thereof and is rigidly secured to the bottom of the trench as by means of lug bolts 12.

The bracket 11 comprises spaced vertical walls 13, in which are supported the opposite ends of a pivot pin 14, which extends through the base end of a stanchion 15. The stanchion is of a length substantially equal to one half of the length of the trenches 10. Also, the stanchions 15 at their free ends are each provided with a member 16, which is pivotally connected to the stanchion, as at 17 and which comprises a nose portion 18 engageable with an arresting cable 19.

The arresting cable 19 in its inoperative position lies on the runway or landing surface R transversely thereof and the opposite ends of such cable are operatively associated with arresting gear means, such for example, as disclosed in Patent No. 2,731,219 issued January 17, 1956, to R. B. Cotton and D. B. Doolittle and which patent is assigned to the instant assignee.

Cooperating with the member 16 is a member 20, which is pivotally connected to the stanchion 15, as at 21. The member 20 includes a nose portion 22, which cooperates with the nose portion 18 of member 16 for initially retaining the arresting cable in engagement with the free end of the stanchion 15 and the said nose portion 22 normally cooperating with a lug 24 for retaining a loop 25 to which is secured one end of a lanyard 26. The members 16 and 20 provide means for release of the cable 19 and the lanyard 26.

The lanyard, which may be a small cable, normally lies on the runway surface and extends over the trench 10 and the stanchion 15, and whose opposite end is connected as at 27 to the lower end of an elongated coil spring 28. The spring 28 is normally disposed in a substantially vertical position adjacent one end of the trench 10. The spring 28 at its upper end is connected by a clip 29 to an actuating cable 30, which is of substantially less gauge than the arresting cable 19.

The actuating cable 30 has its opposite ends connected to the upper ends of posts or stanchions by means of shear links in the manner such as disclosed in the Patent No. 2,450,328, issued to Robert B. Cotton, September 28, 1948, and which patent is assigned to the instant assignee. As disclosed the activating cable 30 is initially retained in horizontal position above the runway R and in the vertical plane of the axes of the springs 28. The stanchions 15 are movable from the horizontal inoperative position indicated in full lines in FIG. 1 to the operative vertical positions indicated by dot-and-dash lines in a manner later referred to and the arresting cable and lanyard releasing members are automatically operated by means of a release bar or rod 31 cooperating with each stanchion 15 and which bar has one end thereof pivotally connected to bracket 11, as at 32, which is eccentric to the pivotal connection 14 of the stanchion.

The member 16 is provided with a recess 24a overlying its pivotal connection 17 and the opposite end of bar 31 rests in said recess in the inoperative position of the stanchion as indicated in FIGURE 1 which holds member 16 in contact with the cable 19 and since member 20 has only clockwise rotation, the two members 16 and 20 normally retain the cable 19.

The said bar 31 is preferably provided with an adjusting turnbuckle 31a and a swivel guide block 31b is carried by the stanchion 15 adjacent its outer end through which said bar 31 extends.

As is indicated in FIGURE 1 the pivotal connection of bar 31 is substantially in a horizontal plane of the axis of pivot 14 and accordingly upon the stanchion reaching a vertical position as indicated by dot-and-dash lines in FIGURE 1 the end of the bar is withdrawn from said recess 24 whereby member 16 is free to swing clockwise and release the cable 19.

Simultaneous with this release of the cable, the member 20 is free to swing clockwise and provide a gap between same and the stanchion for reelase of the lanyard 26 as indicated in the second dot-and-dash position in FIGURE 1.

The operation of the improved structure is illustrated in FIGS. 3, 4 and 5 in three successive stages thereof, wherein the aircraft nose wheel, in FIG. 3, has closely approached the actuating cable 30 and at which time the stanchion 15 is in its normal position, in the trench 10 to the right of bracket 11 and with the arresting cable 19 engaged by the stanchion supported members 16 and 20.

As indicated in FIG. 4, the aircraft has advanced and the nose wheel strut S has engaged the actuating cable 30 and through the lanyard 26 and the spring 28 has swung the stanchion about its pivot 14 throughout an angular range somewhat less than 90° and in which stage the aircraft main gear G is closely approaching the cable 19, which is being retained by the stanchion 15.

As indicated in FIG. 5, the aircraft has further advanced and the stanchions 15 have been further rotated by the actuating cable 30, the springs 28 and lanyards 26, and when the stanchions have reached vertical positions, the cable 19 and the lanyards 26 have been released and the arresting cable is engaged with the aircraft main gear G, whereupon the arresting cable through the arresting gear above referred to rapidly decelerates the aircraft.

The vertical positions of the stanchions 15 are indicated by the dot-and-dash lines in FIG. 3 and at which points the stanchions have attained sufficient momentum to move beyond the vertical positions, whereupon same move under action of gravity and finally rest in the trench to the left of the bracket 11, as is indicated in FIG. 5. It is to be observed that the springs 28 substantially extend in action, whereby the stanchions are moved to operative positions in the absence of sudden jerks and furthermore the extension of the springs provides for timed movement of the main gear to contact the arresting cable 19.

The modified embodiment according to FIGS. 6 to 12, inclusive, is of the same general construction as the first embodiment above described, the primary difference being that while the stanchions have an arcuate movement in the first embodiment, they have only a linear movement in the second embodiment.

Referring now to FIGS. 6 and 7, the runway R is provided with at least two cylindrical cavities 40 whose axes are inclined at an angle of substantially 45° in the direction of movement of aircraft to be decelerated and which axes are in vertical planes spaced from 15 to 20 feet apart transversely of the runway. Disposed within each cavity 40 is a tubular housing 41 of a length to fully encompass the stanchion later referred to.

The housing 41 is preferably provided at its mouth with a circumferential flange 42 which is secured to the runway by suitable bolts 43. The housing 41 is provided with an internal sleeve 44 which is suitably rigidly secured to the inner wall of the housing and which sleeve includes an inner frusto-conical wall 45 and the outer end of the sleeve is spaced inwardly of the flange 42 and the bore 46 in the outer end of the sleeve is of slightly less diameter than the outer end and smaller diameter of the frusto-conical wall thereby providing a shoulder 47.

The housing 41 is further provided with a pair of diametrically opposed guide ribs 48 as extensions of the sleeve 44. The lower end of the housing 41 has a closing wall 49 and disposed within the housing for movement axially thereof is a frusto-conical piston 50 which is provided with an elongated coaxial stem or support 51 which is preferably of tubular form and the combined lengths of the piston 50 and the stem or support 51 are such that when the larger and lower end of the piston is disposed adjacent the housing end wall 49 the outer end of the support 51 is substantially aligned with the outer end of the sleeve 44 and the outer diameter of the support 51 is substantially equal to the diameter of the bore 46 whereby the interior of the housing 41 is substantially sealed and same is provided with fluid 52 for providing a dampening action on the piston 50.

The piston 50 and the support 51 carried thereby provide a stanchion for elevating the arresting cable 53 to a height whereby same is engaged by an aircraft main gear G. The stanchion 50—51 is shown in retracted inoperative position in FIG. 6 and in which position the arresting cable 53 lies upon and transversely of the runway R and same is disposed within a laterally opening notch 54 in a retaining member 55 which has a pivotal connection 56 with a pair of lugs 57 extending outwardly from the support 51 and between which the inner end of the member 55 is disposed. The member 55 is further initially connected to the lugs 57 by means of a shear pin 58 whereby, as will later appear, the member 55 when subjected to a predetermined pull causes shearing of the pin 58 with a resulting pivoting of the member 55 to the dot-and-dash line position in FIG. 7.

A stanchion lifting cable 59 is provided and an end portion thereof extends through an aperture 60 in the piston 50 and which aperture extends throughout the length of the piston in parallel relation to the axis thereof. The inner end of the lifting cable 59 is knotted or otherwise provided with an enlargement 61 which engages the bottom end wall of the piston 50 thereby preventing withdrawal of the lifting cable from the aperture 60 in the piston 50.

The opposite end of the lifting cable 59 has a shear connection 62 with the lower end of an extension coil spring 63 which is initially disposed in vertical position adjacent the upper end of the housing 41 and the upper end of the spring 63 of each stanchion is connected to an actuating tape 64 which is engageable by the nose wheel strut S of an aircraft. The stanchion including the piston 50 and the support 51 is shown in its fully elevated position in FIG. 7 and in which position, the shoulder 65 at the junction of the piston 50 and the support 51 is in engagement with the shoulder 47 on the sleeve 44.

Four successive stages of operation are shown in FIGS. 9, 10, 11 and 12, respectively. As indicated in FIG. 9 the stanchion 50—51 is in fully retracted position with the vertically disposed springs 63 and actuating tape 64 in vertically disposed position adjacent the outer ends of the housings 41, and the nose wheel strut S is advancing and is in a position about to engage the tape 64.

As indicated in FIG. 10 the aircraft has substantially advanced and the nose wheel strut S has engaged the actuating tape 64 through which the spring 63 has been extended and the cable 59 has lifted the stanchion 50—51 to a position intermediate the positions of FIGS. 6 and 7 and in which position the main gear is approaching the rising stanchion.

As indicated in FIG. 11 the aircraft has further advanced, the spring 63 has been substantially extended and through which end the lifting cable 59 the stanchion 50—51 has been elevated to its maximum range and the arresting cable 53 has been positioned at an elevation to be engaged by the aircraft main gear G which as shown is approaching the stanchions.

As indicated in FIG. 12 the aircraft has further advanced, the main gear G has engaged the arresting cable 53 and the forward pressure on the arresting cable has caused the pins 58 to shear with a resulting pivoting of member 55 to a position wherein the notches 54 permit ready removal of the arresting cable. Furthermore the advanced position of the nose wheel strut with respect to the stanchion has caused the shear connections 62 between the cable 59 and the springs 63 to break. During further advance movement of the aircraft the arresting cable 53 through the action of the referred to arresting engines rapidly decelerates the aircraft.

Two or more stanchions are disposed transversely of the runway and in the use of more than two the operation will not be impaired even though a stanchion is struck by the aircraft wheels since in such action the stanchion will be bent down to the runway and the slot 54 therein will permit removal of the cable 53 whereby same will be maintained by the other stanchions at a main gear engaging height above the runway.

While the invention has been disclosed in accordance with certain preferred structural embodiments thereof, it is to be understood that such disclosure has been for the purpose of illustration and is not to be interpreted in a limiting sense and that the invention is to be limited only by the scope of the appended claims.

What is claimed is:

1. Aircraft arresting means, comprising in combination with an aircraft runway, a plurality of trenches disposed longitudinally of the runway and in laterally spaced parallel relation, an arresting unit associated with each trench, each said unit comprising a bracket supported in the trench intermediate the ends thereof, an elongated stanchion of substantially one-half the length of said trench, means pivoting one end of the stanchion to said bracket, the opposite end of said stanchion being provided with releasable arresting cable supporting means and the stanchion normally lying in said trench at one side of said bracket with the said arresting cable lying on the surface of the runway transversely thereof, an aircraft nose wheel strut engageable actuating cable releasably supported in elevated position in advance of said stanchion with reference to the direction of movement of the aircraft, an elongated coil spring normally disposed in vertical position and having its upper end connected to said actuating cable to thereby support the same above the runway, and a lanyard having one end thereof connected to the lower end of said spring and the opposite end thereof releasably connected to said stanchion after the same is raised by the quick action imparted thereto by the extension of said spring.

2. The structure according to claim 1, wherein said stanchion is pivotally mounted in a bracket extending from the bottom of said trench and intermediate the ends of said trench, whereby said stanchion is movable through an angle of 180° and which after release of the arresting cable falls into said trench at the opposite side of said bracket.

References Cited in the file of this patent
UNITED STATES PATENTS

| | | |
|---|---|---|
| 1,481,666 | Francis | Jan. 22, 1924 |
| 1,789,653 | Hoyt | Jan. 20, 1931 |
| 2,846,166 | Daniels | Aug. 5, 1958 |
| 2,854,201 | Cotton | Sept. 30, 1958 |